United States Patent [19]

Hamilton

[11] 3,793,158

[45] Feb. 19, 1974

[54] DEVICE AND METHOD FOR MEASURING RELATIVE CONCENTRATION CHANGES IN GAS STREAM COMPONENTS

[75] Inventor: Charles Eugene Hamilton, Midland, Mich.

[73] Assignee: The Dow Chemical Company, Midland, Mich.

[22] Filed: Feb. 5, 1971

[21] Appl. No.: 112,980

[52] U.S. Cl. .............................. 204/1 T, 204/195 R
[51] Int. Cl. .......................................... G01n 27/46
[58] Field of Search ........................ 204/195 R, 1 T

[56] References Cited
UNITED STATES PATENTS

| | | | |
|---|---|---|---|
| 2,278,248 | 3/1942 | Darrah | 204/195 R |
| 2,414,411 | 1/1947 | Marks | 204/195 R |
| 2,517,382 | 8/1950 | Brinker et al. | 204/195 R |
| 2,651,612 | 9/1953 | Haller | 204/195 R |
| 2,805,191 | 9/1957 | Hersch | 204/195 R |
| 2,992,170 | 7/1961 | Robinson | 204/195 R |
| 3,005,758 | 10/1961 | Spracklen et al. | 204/195 R |
| 3,258,415 | 6/1966 | Kordesch | 204/195 R |
| 3,315,271 | 4/1967 | Hersch et al. | 204/195 R |
| 3,329,599 | 7/1967 | Brewer | 204/195 R |

Primary Examiner—T. Tung
Attorney, Agent, or Firm—Edward E. Schilling

[57] ABSTRACT

A device for detecting and measuring fluctuations on a continuous basis and at most any concentration level, in a flowing gas stream, of a reactive component such as, oxygen, chlorine, bromine, iodine, sulfur dioxide, sulfur trioxide, hydrogen sulfide, carbon monoxide and compatible mixtures thereof utilizes as the detecting element a concentration cell made from two electrodes formed of substantially identical metal, a reference electrode and a sample electrode, at least the latter being foraminous in nature, an aqueous electrolyte containing a mobile soluble ion, the electrolyte contacting substantial areas of both electrodes, a substantially constant atmosphere or a lack of any atmosphere around the reference electrode, an enclosed zone around the sample electrode and means for bringing the gas stream to and from the enclosed zone. No impressed voltage or amperage is applied. The small potential difference across the electrodes generated by chemical equilibrium shifts in the concentration cell caused by fluctuations in the gas stream composition are measured by a sensitive Wheatstone bridge or a microammeter or other sensitive detection means.

20 Claims, 12 Drawing Figures

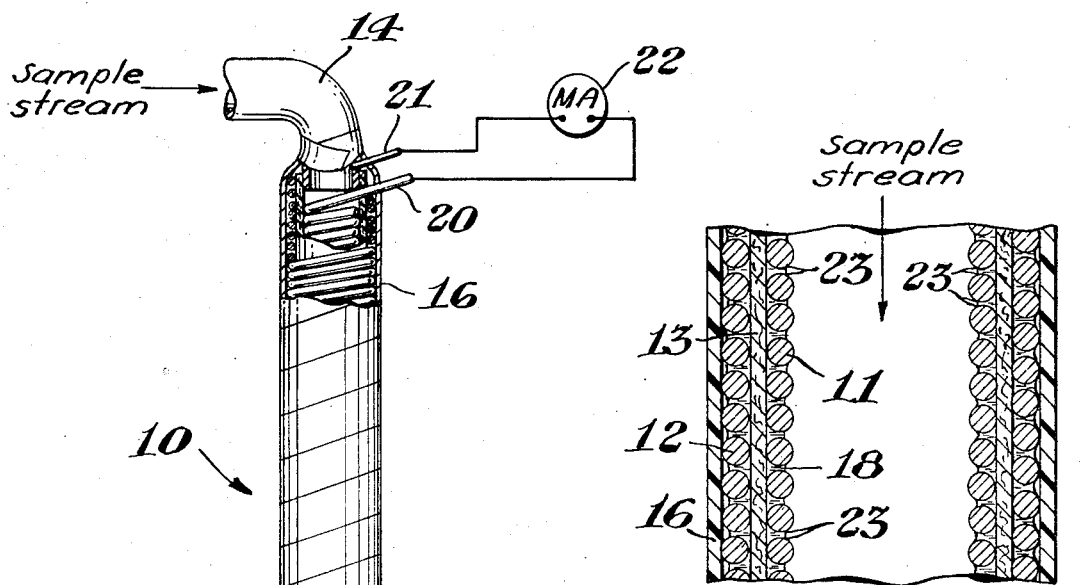
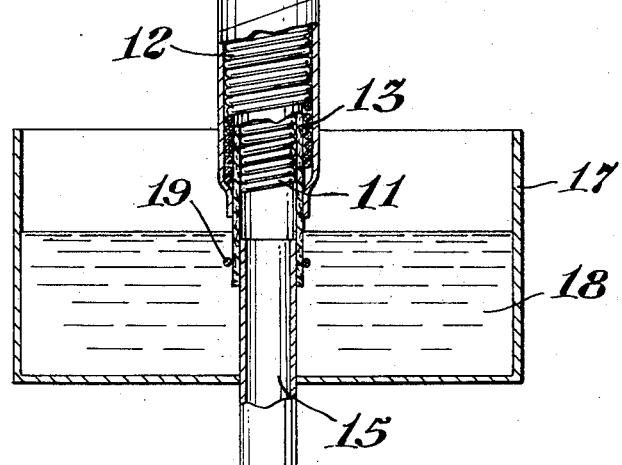
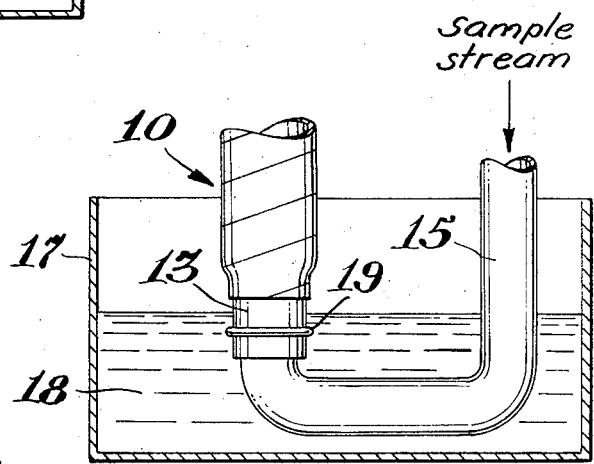
Fig. 1
Fig. 2
Fig. 3
INVENTOR.
Charles Eugene Hamilton INVENTOR.
Charles Eugene Hamilton
BY
Edward E. Schilling
ATTORNEY INVENTOR.
Charles Eugene Hamilton
BY
Edward E. Schilling
ATTORNEY

DEVICE AND METHOD FOR MEASURING RELATIVE CONCENTRATION CHANGES IN GAS STREAM COMPONENTS

The method of measuring fluctuations in composition of a gas stream comprises passing the fluctuating gas stream over the juncture of a sample electrode and an aqueous electrolyte containing a mobile soluble ion, the sample electrode being in electrolytic contact, through the aqueous electrolyte, with a reference electrode formed of a substantially identical metal and the two electrodes being in electrical contact through sensitive electrical current or voltage detection means, and measuring the concentration cell effects as composition fluctuations occur.

BACKGROUND OF THE INVENTION

1. Field of the Invention

The invention relates to galvanic apparatus and method of detecting, on a continuous basis, qualitatively and quantitatively, fluctuating changes in the composition of a gas stream containing an electrolyte-soluble, detectable non-inert gas in a range from substantially 100 per cent base line concentration down to barely detectable concentrations of the gas component being measured. The invention particularly relates to apparatus and method of detecting and measuring gas stream composition changes with a galvanic cell containing substantially identical electrodes but without means for impressing a potential across the electrodes, the sample electrode being semi-immersed in a common electrolyte, and the reference electrode being at least semi-immersed.

2. Description of the Prior Art

A rather thorough discussion of galvanic analysis methods and cells is set forth in "Advances In Analytical Chemistry and Instrumentation," Volume 3, John Wiley & Sons, Inc., New York, 1964, in the section at pp. 183-249 on Galvanic Analysis contributed by P. Hersch, the historical descriptions being found at pp. 185-188. Galvanic cells employing electrodes formed of dissimilar metals have been employed to measure a number of oxidants in air but have been found to be insensitive to the most common oxidant — oxygen. Hersch, in British Pat. No. 913,412 published Dec. 19, 1962, describes a cell employing like electrodes, which are semi-immersed in a common electrolyte, to provide a three phase boundary between gas, electrolyte and sample electrode and utilizes an applied potential sufficient to reduce oxygen, but insufficient to decompose water. The use of an applied potential is essential to Hersch's method. The Hersch cell is more sensitive than most of its predecessors but it suffers from the disadvantages that it is not suited to detecting small changes at high oxidant level, nor in exhibiting the sensitivity now desired in an even more sophisticated world of pollution control technology.

OBJECTS OF THE INVENTION

It is a principal object of the invention to provide galvanic apparatus for and a method capable of continuous detection and quantitative measurement of small fluctuations in composition in the parts per million range range, or greater, in a stream consisting mainly or partly of a reactive gas such as oxygen, which undergoes a detectable, but not rapidly destructive, electrode reaction, the reactive gas being a component of a gas stream in which the other component or the mixture of remaining components is relatively non-reactive with the electrodes, the electrolyte, and, the membrane, if any, used to retain electrolyte in contact with the electrodes.

Another object of the invention is to provide method and apparatus capable of continuously detecting and measuring fluctuations as small as parts per million in concentration of a reactive gas in a gas stream in which the reactive gas is present in a concentration above about 50 per cent and as high as 98 per cent by volume.

A further object of the invention is to provide a galvanic cell for the detection and measurement of small fluctuations in composition of a gas stream which employs relatively low cost electrodes in a compact composite cell.

STATEMENT OF THE INVENTION

The invention is based on the discovery that upon providing a calibrated galvanic gas analysis cell utilizing a reference electrode and a sample electrode each formed of a like metal, at least the latter being foraminous, the sample electrode being semi-immersed and the reference electrode at least semi-immersed in a common aqueous electrolyte containing a mobile soluble ion, maintaining a substantially constant environment around the reference electrode and passing a gas stream containing a fluctuating level of an electrode-reactive gas over the sample electrode whereby the reactive gas contacts the juncture of electrolyte and sample electrode forming a three-phase boundary, fluctuations in concentration of said reactive gas create a concentration cell resulting in a fluctuating potential difference between the sample and reference electrodes that is proportional to the magnitude of the fluctuations in the concentration of the reactive gas component of the gas stream and upon measuring the potential difference fluctuations of the calibrated cell the gas concentration fluctuations are quantitatively detected and measured.

THE DRAWINGS

The present invention will be better understood upon becoming familiar with the following description, reference being had to the drawings in which:

FIG. 1 is a view of the present device in side elevation partly broken away and in section and partly schematic as to the meter circuit;

FIG. 2 is an enlarged fragmentary view in section of a portion of the cell shown in FIG. 1 showing details of construction;

FIG. 3 is a fragmentary view of a device similar to that of FIG. 1 but having a different configuration for the reservoir and cell effluent conduit;

DESCRIPTION OF THE PREFERRED EMBODIMENTS

Figure 4:
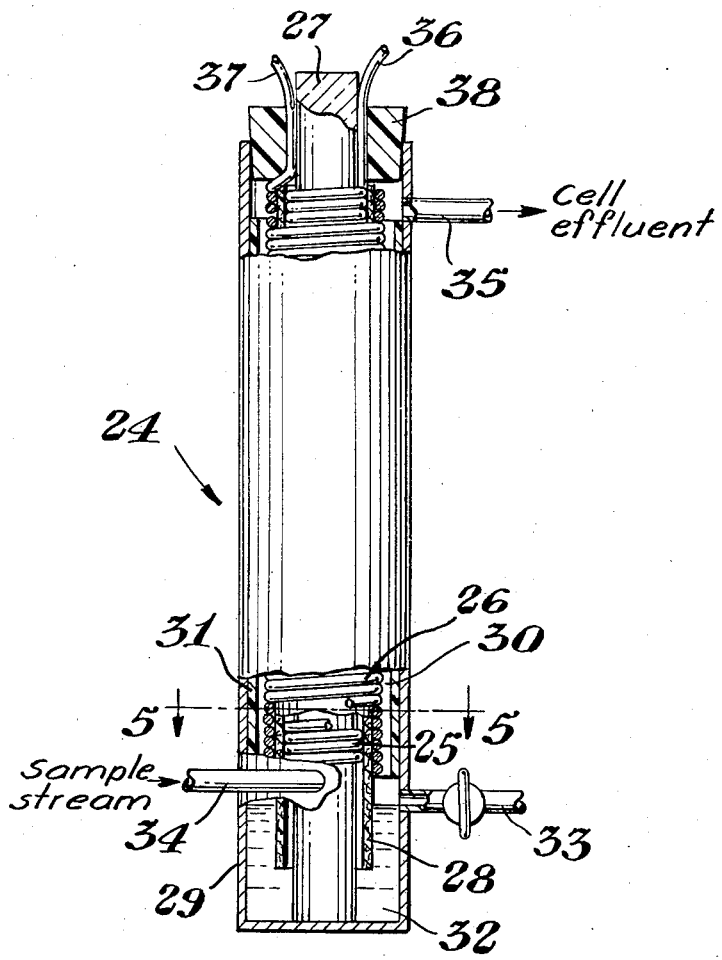
FIG. 4 shows another embodiment of the present device in side elevation partly broken away and in section.

A preferred form of the apparatus of the invention appears in FIG. 1 in which is shown a substantially vertically disposed galvanic cell indicated generally by the reference numeral 10. The cell 10 is made up of two elongated concentric wire helixes 11, 12 which serve as electrodes, the inner helix 11 being separated from the outer helix 12 by a wick-like membrane 13, typically a bibulous paper, that, as a matter of convenience, extends above and below the helixes to make connections with a gas sample inlet conduit 14 and outlet conduit 15, and the combination of helixes and paper sleeve is enclosed, from inlet conduit 14 to outlet conduit 15, by a gas impervious shell 16.

The outlet conduit 15 extends into and through the bottom of a reservoir 17 of aqueous electrolyte solution 18. If desired, the outlet conduit 15 may take the form of the U-tube inlet shown in FIG. 3. The sample stream, as indicated in FIG. 3, may also be flowed upwardly through the cell if more convenient for the geometry of the sampling system, but better response and sensitivity are generally obtained with downdraft operations.

Referring again to FIG. 1, it is essential that the bibulous paper sleeve 13 extend down into the electrolyte 18 for at least about a quarter inch and preferably one-half to three-quarters of an inch so that the sleeve can well serve its purpose as a wick carrying electrolyte up substantially all the way between the helically generated electrodes. A more positive seal of sleeve 13 to outlet conduit 15 is readily assured by placing a rubber retaining ring or band 19 around the sleeve where it overlaps and surrounds the conduit.

The cell 10 throughout most of its length is enclosed by the gas impervious shell 16 which is conveniently a simple spiral wrapping of a substantially gas impervious pressure sensitive tape such as the modern synthetic plastic electrician's tape. Electrical leads 20, 21 extend through the wrapping 16 from the upper end of each helical electrode 11, 12, respectively, and are electrically connected through means 22 for detecting and measuring small differences in electrical potential between the said electrodes, such means 22 and the electrical connections thereto being represented schematically.

It is essential that the wick-like membrane 13 transports electrolyte 18 up from the reservoir 17 throughout the major part of the length of the helical electrodes 11 and 12 in order to provide a substantial length of three-phase boundary of gas, electrode, and electrolyte and thus achieve sensitivity.

A portion of the wetted electrode combination is shown in the fragmentary sectional view of FIG. 2. Of particular importance is the three-phase boundary of helical electrode, electrolyte and gas stream indicated at several points by the numeral 23. Liquid electrolyte solution wets each helix throughout at least a substantial portion thereof and the meniscus formed with adjacent turns of each helix determines the location of the three-phase boundary. The three-phase boundary is actually a substantially continuous zone or line in the case of each helical form electrode semi-immersed in electrolyte. The zone constitutes a reaction site for the electrode reaction. Such zones are discontinuous or segmented in the case of grid or screen or perforated sheet type electrodes. However, in each case there must be electrical continuity throughout each electrode from the electrolyte in the reservoir to the electrical lead connected to the potential difference measuring means.

The three-phase boundary, then, is where the all important electrode reactions take place at the sample electrode and the extent and nature of such boundary greatly determine the sensitivity of the present apparatus and method, while the length of the electrolyte path between the two electrodes greatly affects response time.

The present apparatus and method are capable of detecting and quantifying extremely small rapid fluctuations in gas concentration, providing sensitive methods of measuring changes in electrical potential are used. Thus, e.g., in a gas stream consisting of a mixture of hydrocarbon gases and containing oxygen as an impurity, concentration changes of the order of 0.5 nanograms of oxygen impurity per liter per millisecond are measurable with an oscilloscope read out on the meter measuring changes in potential difference. More typically, changes of 500 nanograms per liter per second or greater change per greater time period are measurable.

The present apparatus is based upon the utilization of a concentration cell and differs fundamentally from polarographic cells in which an externally generated potential is applied across the electrodes. The potential difference in the present cell that is detected and measured is autogeneously generated as a consequence of a difference in concentration of an active ionic or molecular species at the respective electrodes, concentration differences arising from and as a consequence of changes in composition of a flowing gas stream moving past the sample electrode and causing changes at the three-phase boundary.

Typical of the half-cell or electrode reactions are the cathodic reactions of oxygen in neutral or alkaline aqueous medium:

$$O_2 + 2H_2O + 4e^- \leftarrow 4OH^-$$

and acidic aqueous medium: 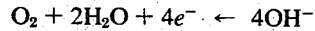 $O_2 + 4H^+ + 4e^- \rightarrow 2H_2O$

Other half cell reactions are:

$$Cl_2 + 2e^- \rightarrow 2\,Cl^-$$

$$CO + e^- \rightarrow CO^- \text{ (carbonyl complex)}$$

In each case, for the gas component to be detectable, a cathodic reaction must take place rapidly enough to create sufficient potential difference to permit detection of whatever order of magnitude of change is essential for utility.

The electrolyte solution as the term implies, should contain an electrolyte supplying ions mobile enough to transmit current quickly and electrolytically. The solution must be capable of taking up the gas to be detected and facilitating a cathodic reaction. The electrolyte solution, the wick or membrane and the metal of the electrodes are each coordinately selected with care to avoid any interfering reactions which would hide or distort the potential difference arising from the gas-electrode reaction. In addition, these items are also chosen appropriately according to the gas stream and component to be detected so that there is a detectable reaction between the gas and the metal of the electrode but no rapid destructive reaction with the electrodes. An example of a destructive reaction to be avoided is the reaction of aluminum metal in a sodium hydroxide solution. Preferably the gas stream does not react at all with any of the other parts of the cell except the electrolyte solution and then only to the extent that it participates in the electrode reaction.

Examples of suitable combinations of electrode metal and electrolyte are tabulated as follows:

Suitable Combinations of Electrode Metal and Electrolyte

| Metal | Electrolyte |
| --- | --- |
| Silver | NaOH |
| Silver | NaCl |
| Silver | $AgNO_3$ |
| Platinum | NaOH |
| Platinum | NaCl |
| Platinum | $PtCl_4$ |
| Palladium | $PdCl_2 \cdot 2H_2O$ |
| Copper | $CuCl_2$ |
| Copper | $CuCl_2 \cdot 2NH_4Cl$ |
| Copper | $CuSO_4$ |
| Aluminum | $(Al)_2(SO_4)_3$ |
| Aluminum | $AlCl_3$ |
| Iron | NaCl |
| Iron | $FeCl_3$ |
| Stainless Steel (316) | NaOH |
| Stainless Steel (316) | NaCl |
| Lead | $Pb(NO_3)_2$ |
| Lead | $Pb(C_2H_3O_2)_2$ |

The electrolyte concentration used is generally about 5-15 per cent by weight.

The gas components to be detected are classifiable into oxidizing gases and reducing gases. Since many oxidizing gases are not stable in the presence of reducing gases, mixtures of the two will seldom be subjected to analysis unless they are not mutually reactive, i.e., compatible.

The method does not admit readily of distinguishing between different oxidizing gases nor between various reducing gases and works best if only one component fluctuates, although in some instances more or less selectivity is accomplished by an appropriate choice of electrode metal where differential reactivity is possible. In general, one will not be interested in the total change in a mixture of components in a gas stream, but will hold the concentration of all components but one steady and measure the change in the single component with the present apparatus and process. The following oxidizing gases are readily monitored in the listed gas streams:

| Oxidizing Gas | Gas Stream |
| --- | --- |
| Oxygen | Air |
| Oxygen | Nitrogen |
| Oxygen | Carbon Dioxide |
| Halogen (Atomic No. > 20) | Air |
| Halogen (Atomic No. > 20) | *HX Vapors |
| Halogen (Atomic No. > 20) | Volatile Organic Compounds |
| Sulfur Dioxide | Air |
| Sulfur Trioxide | Air |

*HX = hydrogen halide

The following reducing gases are readily monitored in the listed gas streams:

| Reducing Gas | Gas Stream |
| --- | --- |
| Hydrogen Sulfide | Methane |
| Hydrogen Sulfide | Methane-Carbon Dioxide Mixture |
| Carbon Monoxide | Carbon Dioxide |
| Carbon Monoxide | Air |
| Carbon Dioxide | The Inert Gases, e.g. He |

The gas stream to be monitored is brought into intimate contact with the sample electrode so that the three-phase boundary condition is fulfilled. However, the gas stream must be kept out of contact with the reference electrode or there can be little concentration cell effect.

The reference electrode must be surrounded by a relatively constant or unchanging environment in order to detect the changes at the sample electrode and measure the amount of change. The environment around the reference electrode may be electrolyte and (1) a flowing gas of constant, known composition, (2) electrolyte and a static gas environment, (3) eletrolyte, and, void spaces filled with vapor from the aqueous electrolyte including, in some cases, gas from the sample stream diffused through the electrolyte, or (4) electrolyte only, depending on the type of cell construction selected.

It must constantly be kept in mind that measurements by the present method are relative and that the thing which is detected and measured, is change in concentration of a gas component. On steadily passing a given gas stream of highly uniform composition through the apparatus of the invention, a steady base line is drawn by a recorder attached to or a part of the potential difference measuring means. Electrode reactive components in the gas stream will enter the electrolyte and diffuse to the reference electrode so that a steady state is reached at which there is no concentration cell effect, and consequently no potential difference between the electrodes. At this point, increasing the concentration of the reactive gas component makes one electrode the cathode and the other the anode. But, decreasing the concentration of the same component from the said steady state level reverses the electrode relationships. As a consequence, fluctuations of gas concentration both above and below the steady state or base line value results in recorder peaks both above and below the base line. This may be disconcerting if not understood, and moreover, cuts the 0 to 100 adjustment on the recorder at least in half on at least one side of the base line.

The problem of fluctuations across the base line is avoided by providing as the gaseous part of the environment around the reference electrode, a static or a dynamic gas atmosphere sufficiently different from the sample stream in concentration of reactive component as to assure freedom from reversal of electrode designations. Thus, by proper manipulation of the reference electrode environment, the problem of fluctuations across the base line is avoided.

Figure 11:
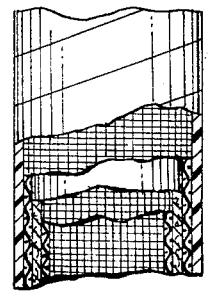
FIG. 11 is a fragmentary view partly broken away successively and in section of a portion of a device similar to that of FIG. 1, but having grid form electrodes instead of wire helix electrodes.
Figure 12:
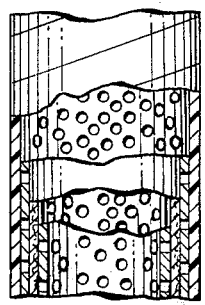
FIG. 12 is a fragmentary view similar to FIG. 11 showing a portion of a device according to the invention with perforated sheet form electrodes.

As herein illustrated by the various embodiments, the sample electrode structure should be gas permeable substantially throughout the extent of the electrode structure while the reference electrode may be gas permeable or impermeable. Thus, the electrodes may each be a wire helix or a fine wire screen or sieve, i.e., with small openings as illustrated in the fragmentary sectional view of FIG. 11, showing a cell arrangement similar to FIG. 1, or, a highly perforated or foraminous metal sheet as illustrated in the fragmentary sectional view of FIG. 12, while the reference electrode may generally be the same or take the form of an unperforated sheet, the latter being applicable where the reference atmosphere is really zero atmosphere and no three-phase boundary is required at the reference electrode.

The gas permeable electrodes should have a total length of three-phase boundary in the range of about 340 to 350 inches per square inch of electrode metal surface exposed to the gas stream.

The electrodes may be disposed closely adjacent concentrically, or, face to face, if planar, or, disposed in separate gas compartments but contacted throughout a substantial surface area by the same electrolyte. Contacting includes complete immersion of the reference electrode and semi-immersion of both electrodes with or without the aid of a bibulous paper or other wick-like membrane in contact with the electrode.

The most satisfactory all around performance is gotten from a cell of the invention utilizing a gas permeable sample electrode made up into a helix or screen from wire about 1 to 5 mils in diameter and with a bibulous membrane about 0.5 to 1 mil thick separating the electrodes. Providing (1) for a long three-phase boundary, and (2) for closed-spaced electrodes by utilizing a thin bibulous membrane, facilitates obtaining a rapid, substantial, response from the cell, the path length defined by electrode spacing being particularly critical. On the other hand, using the larger spacing, e.g., on utilizing a thicker membrane between the electrodes, permits the more accurate measurement of slow changes in gas stream composition since the diffusion of the gas component takes place more slowly across the longer electrolyte path through the larger spacing from the sample electrode to the reference electrode.

As another means of keeping the electrolytic path short the viscosity of the electrolyte and the wettability of the electrodes are controlled or modified so that the electrolyte miniscus on the electrodes is not far from the membrane, e.g., not more than about one-third of the wire diameter, the latter being generally in the range of about 1 to 10 mils.

In each case the sample and reference electrodes are formed of the same metal or alloy, or substantially so, in order that the electrical potential therebetween is substantially zero when the composition of the gas stream under study is steady and unchanging so that an appropriate base line reading may be obtained for purposes of accurately measuring rapid small fluctuations in gas concentration measurements.

Figure 5:
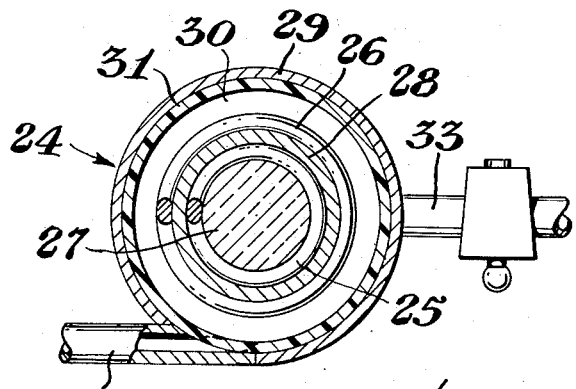
FIG. 5 is a transverse sectional view of the device in FIG. 4 taken along line 5—5.
Figure 6:
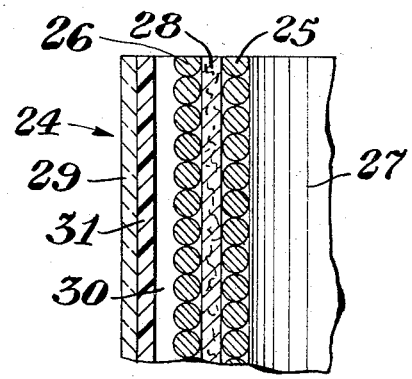
FIG. 6 is an enlarged fragmentary view of part of a section of a portion of the cell shown in FIG. 4 showing details of the relationship of outer wall, hydrophobic liner, annular space, inner and outer wire helixes, the intermediate porous membrane, and the solid inner core.

Another embodiment of the cell of the invention indicated generally by the numeral 24 is shown in Figures 4, 5 and 6 in which are illustrated a concentric arrangement of the helical electrodes 25, 26 with the inner being the reference electrode 25 closed-spaced around a supporting solid rod 27 and surrounded by a bibulous paper sleeve 28 which is, in turn, surrounded by the sample electrode 26. The electrode assembly sits in a substantially rigid cylindrical shell 29 in which an annular space 30 separates the sample electrode 26 from the plastic liner 31 for the shell 29.

The lower end of the cylindrical shell 29 serves as a reservoir for the electrolyte 32 which may be emptied or replenished through a valve controlled side arm 33. The plastic liner 31 may be omitted if desired, but tends to keep electrolyte 32 from wetting the wall of the shell 29 and creeping up the wall where it is subject to the influence of the sample gas stream which tends to drive the electrolyte up the wall and to cause coalesced droplets to bridge the annular space. A sample stream to be analyzed or monitored is introduced through an inlet line 34 connected to the cylindrical shell 29 just above the level of the reservoir of electrolyte 32. The sample gas stream moves up through the annular space 30 and exits through the outlet line 35 which is connected to the cylindrical shell 29 near the upper end thereof. The sample gas stream may also be flowed downwardly through the cell, if desired.

The cell may be closed at the top in any suitable manner so long as provision is made to support and space the solid rod 27 and helical electrodes 25 and 26 and to bring out the electrode leads 36, 37 from the enclosure, here, as shown, by bringing the leads out through a stopper 38 that has been centrally pierced to slide over the solid rod 27.

Figure 7:
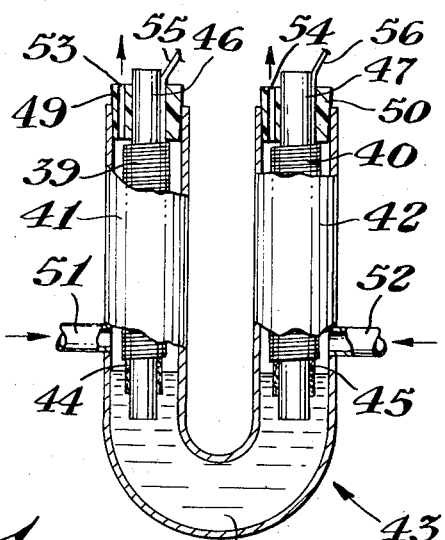
FIG. 7 shows yet another embodiment of the present device in side elevation partly broken away and in section.

In an additional embodiment of the apparatus of the invention shown in FIG. 7, the sample electrode 39 and the reference electrode 40 are each provided in cylindrical shell form, here as wire helixes, though the electrodes may also be in the form of wire grids or screens, or perforated thin metal plates. Each electrode is disposed in a respective area 41, 42 of the U-shaped tube 43. Each electrode 39, 40 is disposed concentrically and snugly about a wick-like sleeve 44, 45, generally of bibulous paper, which has been slipped onto a supportive rod or core 46, 47. The electrodes 39, 40 are positioned vertically just above the electrolyte 48 in the lower part of the U-tube 43, while the wick-like sleeves 44, 45 extend down the electrolyte 48. The cores 46 and 47 and accompanying electrodes and sleeves are respectively supported and spaced centrally in the arms 41, 42 of the U-tube 43 by insertion into stoppers 49, 50, substantially closing the said arms of the U-tube. It is necessary to vent the gas streams entering each arm of the U-tube through respective side arms 51, 52, and this may be done by providing a borehole 53, 54 in each stopper or, if desired, by providing a sidearm to each arm of the U-tube adjacent the stoppers.

It is not necessary to provide a flowing gas atmosphere around the reference electrode 40 and generally it will be preferred to close off or eliminate the side arm 52 and the vent 54, thus creating a static, fixed atmosphere in the arm 42.

The electrical leads 55, 56, one from each electrode, are conveniently brought out through the stoppers 49, 50, adjacent the cores 46, 47, as shown, or at the perimeter of the stoppers, and are connected to an instrument (not shown) for measuring small differences in electrical potential.

The U-tube type cell exhibits a sluggish response, requiring up to 15 minutes or more to react to change, presumably because of the relatively long electrolytic path. Such a cell is useful in detecting slower changes which tend to be not detectable with the fast response cells. This is especially to be expected with the fast cells having only a diffused atmosphere around the reference electrode since the nature of the electrolyte composition and membrane permeability effect the gas diffusion rate to equal the drift with the slow change and thus both electrodes would appear to be seeing like concentrations throughout the period of slow change.

Figure 10:
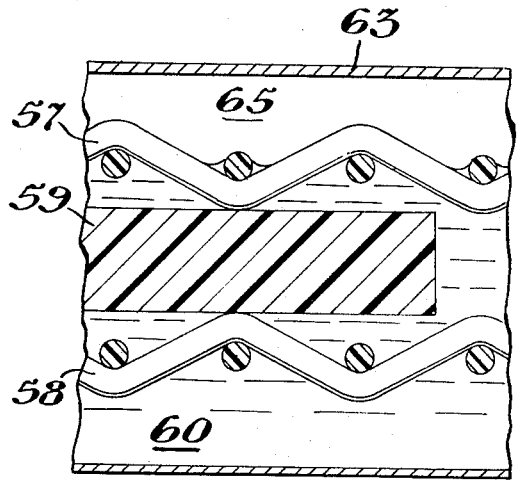
FIG. 10 is an enlarged fragmentary view in section of a portion of the electrode grids of FIG. 9 showing the relationship to the electrolyte level in the device.
Figure 8:
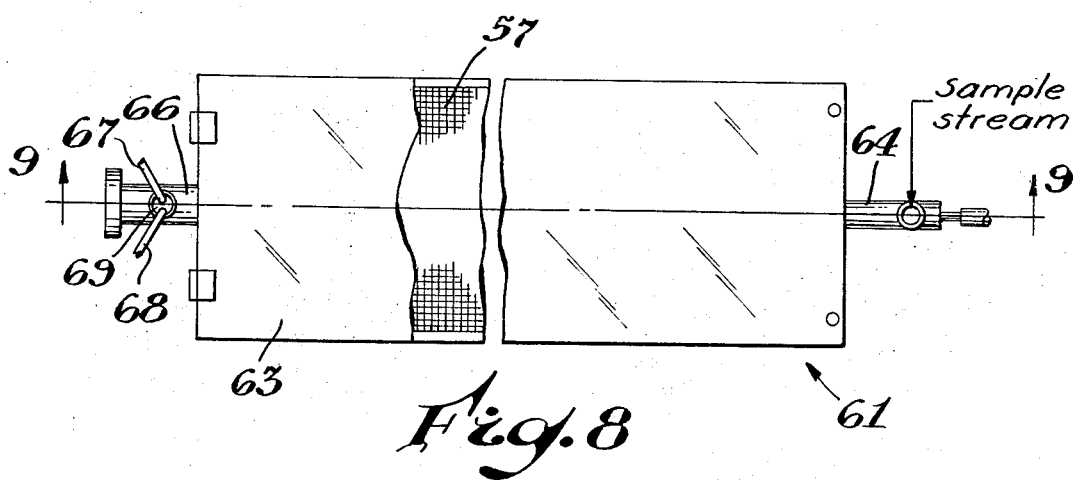
FIG. 8 shows a foreshortened top view of still another embodiment of the device of the present invention, with the glass cover partly broken away and with the electrolyte reservoir omitted.
Figure 9:
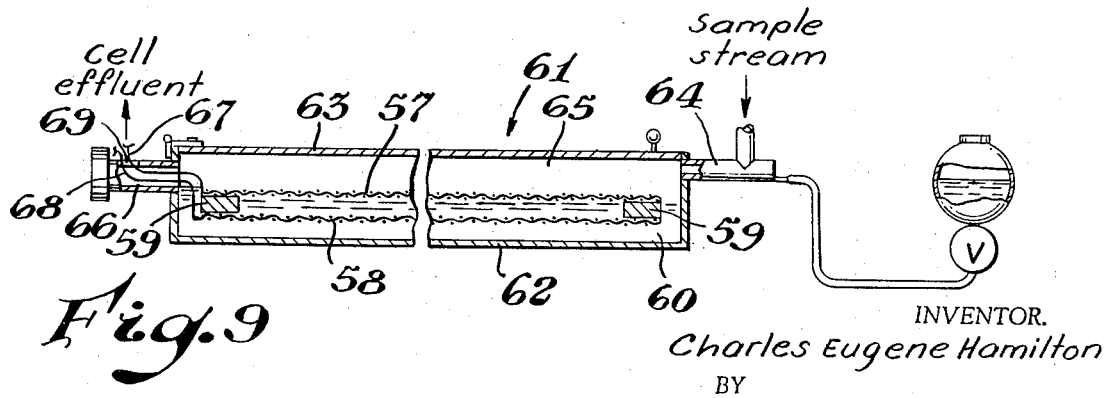
FIG. 9 is a view in vertical section and partly schematic of the device of FIG. 8 taken along the line 9—9, but with the electrolyte reservoir added.

Yet another embodiment of the apparatus of the invention is shown in FIG. 8, 9 and 10. In this embodiment the electrodes 57, 58 are planar grids and there is no need to employ a membrane since the superposed, slightly spaced apart, electrodes are supported in a horizontal position by buoyant elements 59 with the lower or reference electrode 58 fully submerged in the electrolyte 60 and the sample electrode 57 very critically and carefully partly submerged so that a substantial extent of three-phase boundary length is provided. The buoyant elements 59 may be pieces of cork or other low density natural material but is preferably a cellular synthetic polymeric material, such as foamed polyurethane, with substantially all closed cells, and is desirably resistant to deterioration upon long immersion in the electrolyte 60. The cell proper, indicated generally by the numeral 61, is a shallow rectangular vessel 62, preferably with a cover conveniently opened, such as the hinged cover 63 shown. An inlet connection 64 at one end of the vessel admits sample stream as well as make-up electrolyte in the event of evaporative losses, although the electrolyte may be supplied through a separate inlet if desired. Make-up additions are an essential part of the critical function of keeping the electrolyte level substantially constant in the cell.

The sample stream passes over the electrolyte grid 57, filling the space 65 above said grid, and moving on out through the exhaust outlet 66. The electrical leads 67, 68 from the respective electrodes 57, 58 are conveniently led out of the cell through an opening 69 in the exhaust outlet 66 and normally are connected to a meter (not shown).

The present cell can detect small changes in concentration in a component present in high concentration more readily than a cell using dissimilar electrodes and a polarographic current since there is no bucking potential employed to balance the polarographic current at the meter. Where polarographic current is employed, the noise level in the bucking potential at the meter becomes equivalent in magnitude to changes in current due to small changes in gas concentration and the latter cannot be readily detected amongst the noise peaks.

To avoid undue drying out of the wick or membrane in working with a relatively low humidity gas stream, it is preferred to scrub the gas stream with an inert or gas-saturated aqueous scrubber ahead of the detection cell of the invention and to supply the gas stream to the cell at substantially constant humidity.

What is claimed is:

1. The galvanic cell device for detecting and measuring fluctuations in the concentration level, in a flowing gas stream, of an electrode reactive gaseous component which comprises:

measuring means and sensing means for an autogenously generated electrical potential difference;

the sensing means consisting essentially of a substantially enclosed cell having an inlet and an outlet, said cell having disposed therein a sample electrode and a reference electrode each formed of substantially the same metal whereby the electrical potential between the electrodes is substantially zero when the composition of said gas stream is steady and unchanging, said cell having a liquid reservoir portion adapted to hold an aqueous electrolyte solution at least closely adjacent to each electrode whereby the electrodes are readily connected electrolytically, said cell having means for directing the flowing gas stream over the sample electrode during passage from the inlet to the outlet and means for keeping the gas stream out of contact with (1) the reference electrode and (2) the electrolyte in the reservoir;

and the sample and reference electrodes being electrically connected via said measuring means for the autogenously generated electrical potential difference, and said sample and reference electrodes when connected electrolytically and further connected electrically in series to said measuring means constituting a concentration cell;

said cell being without means for impressing a potential across the electrodes;

and the sample and reference electrodes being adapted to autogenously generate an electrical potential difference only upon fluctuations in the gas stream composition.

2. The galvanic cell device for detecting and measuring fluctuations in the concentration level, in a flowing gas stream, of a gaseous component selected from the group consisting of oxygen, chlorine, bromine, iodine, sulfur dioxide, sulfur trioxide, hydrogen sulfide and carbon monoxide and a mixture thereof which comprises:

measuring means and sensing means for an autogeneously generated potential difference;

the sensing means consisting essentially of a substantially enclosed cell adapted to permit passage of the gas stream therethrough and containing an aqueous electrolyte solution in addition to first and second electrodes each formed of the same metal the electrodes being connected (1) electrically, via the potential difference measuring means and (2) electrolytically, via the aqueous electrolyte solution and the cell being without means for impressing a potential across the electrodes;

said first electrode being a sample electrode having a foraminous structure and said electrode having a surface adapted to be exposed to said flowing gas stream and to have zones in which gas stream, electrolyte solution and metal surface meet to form a three-phase boundary;

said second electrode being a reference electrode adapted to be in contact with an unchanging environment with respect to the gas stream component to be detected and measured;

said aqueous electrolyte solution containing a mobile soluble ion and being not destructively reactive with the electrode metal under test conditions;

and means for bringing the flowing gas stream to and from the sample electrode.

3. The device as in claim 2 in which each electrode is planar in form, the electrodes being substantially horizontally disposed, slightly spaced apart, substantially parallel and co-aligned and suspended in the electrolyte solution, one of the electrodes being foraminous and only partly submerged and the other electrode being entirely submerged.

4. The device as in claim 2 in which the electrodes are substantially vertically disposed and separated by a porous membrane with which each electrode is in substantial contact, the electrodes being adjacent and above the electrolyte solution, the membrane extending into and being wetted by and having wicking action toward the said electrolyte solution, and the electrolyte solution being taken up substantially throughout the extent of the membrane.

5. The device as in claim 4 in which the electrodes and membrane are each substantially in the form of contiguous concentric cylindrical shells.

6. The device as in claim 5 in which the sample stream is adapted to flow through a space defined by the inside surface of the innermost concentric shell-form electrode which is the sample electrode.

7. The device as in claim 5 in which the innermost concentric shell-form electrode is the reference electrode and fits around a solid core support, the means for bringing the gas stream to and from the sample electrode includes a body shell surrounding the concentric array of electrodes and membrane and spaced apart therefrom to provide an annulus through which the gas stream is adapted to flow, the outer electrode in the array being the sample electrode.

8. The device as in claim 4 in which the electrolyte solution is about a 5 to 15 per cent by weight aqueous solution of an inorganic electrolyte and the membrane is about 0.5 to about 1 mil thick.

9. The device as in claim 2 in which the first electrode has zones thereof in which the gas stream, the electrolyte solution and the metal surface of the electrode itself meet along a line that constitutes a three-phase boundary and the ratio of the total length of three-phase boundary to the gas contact area of the electrode is at least about 340, length and area being expressed in terms of the same basic units of linear measurement.

10. The device as in claim 2 in which each electrode is disposed in a respective arm of a U-tube having electrolyte solution therein, the electrodes each being adjacent and above the electrolyte solution and each electrode having a wick-like porous membrane in substantially coextensive contact therewith, each membrane extending into the electrolyte solution and being wetted thereby, and the electrolyte solution being taken up substantially throughout the extent of each membrane.

11. The device as in claim 2 in which the potential difference measuring means is a potentiometric apparatus.

12. The device as in claim 2 in which the potential difference measuring means is an amperometric apparatus.

13. The device as in claim 2 in which the metal of which the electrodes are made is a metal selected from the group consisting of silver, platinum, palladium, copper, aluminum, iron, 316 stainless steel, and lead.

14. The device as in claim 2 in which the electrodes are each made of silver and the electrolyte solution is an aqueous solution of a compound selected from the group consisting of NaOH, NaCl and $AgNO_3$.

15. The device as in claim 2 in which the electrodes are each made of platinum and the electrolyte solution is an aqueous solution of a compound selected from the group consisting of NaOH, NaCl and $PtCl_4$.

16. The device as in claim 2 in which the electrodes are each made of copper and the electrolyte solution is an aqueous solution of a compound selected from the group consisting of $CuCl_2$, $CuCl_2 \cdot 2 NH_4Cl$ and $CuSO_4$.

17. The device as in claim 2 in which the electrodes are each made of aluminum and the electrolyte solution is an aqueous solution of a compound selected from the group consisting of $Al_2(SO_4)_3$ and $AlCl_3$.

18. The device as in claim 2 in which the electrodes are each made of lead and the electrolyte solution is an aqueous solution of a compound selected from the group consisting of $Pb(NO_3)_2$ and $Pb(C_2H_3O_2)_2$.

19. The method of detecting the fluctuations in the concentration level, in a flowing gas stream, of a gaseous component selected from the group consisting of oxygen, chlorine, bromine, iodine, sulfur dioxide, sulfur trioxide, hydrogen sulfide and carbon dioxide and a mixture thereof which comprises:

providing a sample electrode and a reference electrode of substantially the same metal, a porous membrane, and a reservoir containing an aqueous electrolyte solution, the electrodes being separated by and each in contact with the porous membrane, the membrane extending into and being wetted by and haVing wicking action toward the electrolyte solution and the electrolyte solution being taken up substantially throughout the extent of the membrane, said electrolyte solution containing a mobile soluble ion and being not destructively reactive with the electrodes, both electrodes being electrically connected via potential difference measuring means, conducting said gas stream over the sample electrode without contacting the reference electrode or the electrolyte solution in the reservoir, and measuring changes in potential difference between the electrodes as a consequence of said fluctuations without impressing a potential across the electrodes.

20. The method as in claim 19 in which the reference electrode is provided with a controlled environment that contains a concentration of the said gaseous component such that the reference electrode does not alternately function as cathode and anode as a result of fluctuations in concentration of the said gaseous component being detected in the flowing gas stream.

* * * * *